United States Patent
Vandroux et al.

(10) Patent No.: US 10,603,529 B2
(45) Date of Patent: Mar. 31, 2020

(54) METHOD FOR CONTROLLING THE PURITY/FLOW RATE RELATIONSHIP OF AN INERT GAS INJECTED INTO A FUEL TANK, AN INERTING SYSTEM FOR CARRYING OUT THE METHOD

(71) Applicant: ZODIAC AEROTECHNICS, Roche la Moliere (FR)

(72) Inventors: Olivier Vandroux, Grenoble (FR); Jérémie Missou, Saint Etienne (FR)

(73) Assignee: ZODIAC AEROTECHNICS, Roche la Moliere (FR)

( * ) Notice: Subject to any disclaimer, the term of this patent is extended or adjusted under 35 U.S.C. 154(b) by 200 days.

(21) Appl. No.: 15/804,297

(22) Filed: Nov. 6, 2017

(65) Prior Publication Data
US 2018/0126202 A1    May 10, 2018

(30) Foreign Application Priority Data

Nov. 8, 2016 (FR) ...................... 16 60790

(51) Int. Cl.
| | |
|---|---|
| *B01D 53/02* | (2006.01) |
| *A62C 3/08* | (2006.01) |
| *A62C 99/00* | (2010.01) |
| *A62C 3/06* | (2006.01) |
| *B64D 37/32* | (2006.01) |
| *B60K 15/03* | (2006.01) |

(52) U.S. Cl.
CPC ............... *A62C 3/08* (2013.01); *A62C 3/065* (2013.01); *A62C 99/0018* (2013.01); *B64D 37/32* (2013.01); *B60K 2015/03381* (2013.01)

(58) Field of Classification Search
CPC ....... A62C 3/065; A62C 3/08; A62C 99/0018; B60K 2015/03381; B64D 37/32
See application file for complete search history.

(56) References Cited

U.S. PATENT DOCUMENTS

| | | |
|---|---|---|
| 8,801,831 B1 | 8/2014 | Snow, Jr. et al. |
| 2016/0107116 A1 | 4/2016 | Metrulas |

FOREIGN PATENT DOCUMENTS

WO    WO-2006020286 A2    2/2006

OTHER PUBLICATIONS

French Search Report issued in French Pat. Appl. No. 1660790, dated Jul. 13, 2017.

*Primary Examiner* — Christopher P Jones
(74) *Attorney, Agent, or Firm* — Marshall, Gerstein & Borun LLP

(57) ABSTRACT

An inerting system of a fuel tank of an aircraft includes an air separation module supplied at the inlet with air at a certain pressure to generate at the outlet an inert gas to be injected into the fuel tank comprising a certain flow rate and a certain oxygen concentration. A control method includes, at a given instant and at a constant air temperature and atmospheric pressure, (1) reducing the inert gas flow rate to a determined value, and (2) reducing the air pressure in order to cause an increase in the oxygen concentration from an initial value to a determined value. Decreasing the inert gas flow rate is performed by compensating for a loss of inert gas flow caused by the air pressure reduction, and decreasing the air pressure is performed by compensating for a reduction in the oxygen concentration caused by the inert gas flow rate reduction.

4 Claims, 1 Drawing Sheet

METHOD FOR CONTROLLING THE PURITY/FLOW RATE RELATIONSHIP OF AN INERT GAS INJECTED INTO A FUEL TANK, AN INERTING SYSTEM FOR CARRYING OUT THE METHOD

TECHNICAL DOMAIN

The present disclosure relates to a method for controlling an aircraft fuel tank inerting system such as on an aircraft, a helicopter or similar as well as to two embodiments of an inerting system for carrying out the said method.

BACKGROUND

In the domain of aeronautics inerting systems are known for the generation of an inert gas such as nitrogen or any other inert gas such as carbon dioxide, and for introducing said inert gas into fuel tanks for safety reasons, that is, to reduce the risk of explosion from said tanks.

A conventional, prior art inerting system typically includes an on board inert gas generating system (OBIGGS) supplied with compressed air, for example, with compressed air diverted from at least one engine from a so-called intermediate pressure stage and/or a so-called high-pressure stage based on a flight situation. It should be noted that the use of compressed air from an engine is advantageous because it has a relatively high pressure and temperature so the air can be adjusted to a wide range of desired pressure and temperature settings. The OBIGGS is connected to the aircraft fuel tank and separates oxygen from the air.

The OBIGGS is composed of at least one air separating module containing, for example, permeable membranes such as polymer membranes passed over by an air flow. Due to the different permeabilities of the membrane to nitrogen and oxygen, the system splits the air flow so that an air flow with high nitrogen content and an air flow with high oxygen content are obtained. The air fraction enriched with nitrogen, considered to be the inert gas, is routed into fuel tanks so that the oxygen level present within the free volume of the tank is decreased. The devices required for this process such as compressors, filters, and air or water cooling modules or similar are integrated into the inerting system.

When the oxygen ratio in the empty part of the tank is below the ignition limit defined in accordance with the Federal Aviation Administration (FAA) requirements detailed in AC25,981-2A dated Sep. 19, 2008 entitled "FUEL TANK FLAMMABILITY REDUCTION MEANS" and its appendices, or pursuant to the requirements of the "European Aviation Safety Agency" (EASA), detailed in document AMC25,981, the ignition and deflagration risks are very low or even nonexistent. From the foregoing, inerting a fuel tank is composed of injecting an inert gas into the tank in order to maintain the level of oxygen present within said tank below a certain threshold, for example 12%.

An inerting system is known that is produced according to the dimensioning rules mandated, for example, by document AC25,981-2A or document AMC25,981. The flow rate of the inert gas to be injected is therefore determined at regular intervals as a function of the parameter values of a certified standard mission profile. The certified standard mission profile corresponds to the mission profile most frequently adopted by the aircraft. For example, these parameters may be a free volume of the fuel tank, and/or the rate of descent and/or climb and/or the altitude of the aircraft. The certified standard mission profile recommends, for parameter values at any given instant, the injection of a certain flow rate of inert gas, comprising a certain oxygen concentration, in order to satisfy the regulations in force.

Also known is an inerting system designed to inject inert gas into at least one fuel tank with a flow rate that is designed to meet a requirement that is determined in real time during the flight of the aircraft. This type of inerting system is not based on a certified type of mission profile imposed by the American certification authority which is often more restrictive than the actual mission carried out by the aircraft, and that therefore consumes more air. The injection of inert gas responds to an optimized inerting strategy, based for example upon an estimate of the amount of air entering the fuel tank as a function of the venting thereof, and of the actual volume of fuel consumed.

This type of known inerting system, adapted to the actual inert gas flow rate requirement, implements a function for regulating the inert gas flow rate, downstream of the air separation module. This flow control function implements a flow rate control valve, a set of sensors or a flow meter, and a computer containing a closed loop type flow rate control law. The inert gas flow control setpoint is determined from data relating to the aircraft, such as the variation in the external atmospheric pressure and/or the rate of change of altitude of the aircraft and/or the volume of fuel present within the tank and/or the fuel mass consumed by the engine.

Thus, in optimizing, and in particular in reducing the flow of inert gas injected into the fuel tank, the amount of air consumed by the air separation module decreases, which makes it possible to reduce the operating costs of the inerting system.

However, with the air entering the air separation module at a constant pressure and temperature, and at a constant atmospheric pressure, reducing the inert gas flow rate impacts upon the purity thereof. Indeed, if the flow rate of the inert gas decreases, the purity of the gas improves, i.e., the oxygen concentration thereof decreases.

It follows that this type of inerting system is oversized in relation to the actual inert gas purity requirement, and generates and injects an inert gas with a higher quality than necessary, indirectly causing excess fuel consumption for the aircraft and high operating costs

SUMMARY OF THE DISCLSOURE

One of the aims of the disclosed embodiments is therefore to resolve these drawbacks by proposing a method for controlling an inerting system of an aircraft fuel tank, making it possible to adapt the distribution of inert gas to actual requirements in such a way as to indirectly reduce fuel consumption and the cost of operating the inerting system.

To this end, an inerting system control method is proposed, comprising at least one air separation module supplied with air at a certain pressure in order to generate at the outlet an inert gas to be injected into the fuel tank comprising a certain flow rate and a certain oxygen concentration.

According to the disclosed embodiments, the method comprises, at a given instant and at a constant air temperature and atmospheric pressure:
  an operation whereby the inert gas flow rate is reduced to a determined value;
  an operation whereby the air pressure at the inlet of the air separation module is reduced in order to cause an increase in the oxygen concentration from an initial value to a determined value.

According to disclosed embodiments:

the operation of reducing the inert gas flow rate is performed by compensating for a loss of inert gas flow caused by the air pressure reduction operation;

the operation of reducing the air pressure is performed by compensating for a reduction in the oxygen concentration caused by the inert gas flow rate reduction operation;

When the flow rate of the inert gas is optimized, i.e., reduced, it follows that the purity of the inert gas has unintentionally increased, i.e., the oxygen concentration thereof is reduced, this can be a constraint for the originally planned inerting strategy, if, for example, this only consists in decreasing the inert gas flow rate.

In this way, the control method makes it possible to overcome this disadvantage and to inject an inert gas by dissociating the flow rate and the oxygen concentration, which are intimately linked, from each other. Indeed, the disclosed embodiments make it possible to adjust the inert gas flow rate and/or the oxygen concentration, independently of one another.

In particular, this characteristic makes it possible, when the inert gas flow rate is decreased, to be able to counter the increase in the purity of the inert gas by decreasing the air pressure in order to increase the concentration of oxygen within the inert gas. This prevents the system from producing an inert gas with a higher quality than necessary, i.e., it avoids over-quality. This operation is performed by reducing the air pressure at the inlet to the air separation module, which allows the inerting system to consume less air and therefore to indirectly reduce fuel consumption and the operating costs of the inerting system.

Thus, the disclosed embodiments make it possible to adjust the oxygen concentration to a determined value, which may, for example, be determined on the basis of an actual oxygen concentration requirement determined at the given instant, or else it is possible, for example, to retain an initial oxygen concentration corresponding to the oxygen concentration present within the inert gas before the flow rate reduction operation, by decreasing the pressure of the air at the inlet to the air separation module.

However, as mentioned, this decrease in pressure causes a loss in the flow of inert gas at the outlet of the air separation module. The disclosed embodiments thus make it possible to compensate for this loss of inert gas flow, anticipating the operation of reducing the inert gas flow rate to the determined value. In other words, the flow rate will be reduced to a lesser extent in order to anticipate the loss of flow that will be added thereto, in order to reach the determined threshold value. The inert gas flow rate value is, for example, determined as a function of an actual inert gas flow rate requirement determined at the given instant.

The principle of the embodiments contemplated therefore consists in controlling the purity of the inert gas, at a constant inerting rate, in order to meet the requirement for an inerting strategy for optimizing the operating cost of the inerting system.

The disclosure also relates to two embodiments of an inerting system for implementing the aforesaid method.

Each inerting system is intended to inject inert gas into at least one fuel tank of an aircraft during the flight of the aircraft, and comprises at least one air separation module supplied with air at a certain pressure in order to generate at the outlet an inert gas to be injected into the fuel tank comprising a certain flow rate and a certain oxygen concentration.

According to a first embodiment, the inerting system comprises a controller to which are connected:

a motorized inert gas flow rate control valve positioned at the outlet of the air separation module;

a motorized air pressure control valve positioned at the inlet of the air separation module;

an oxygen sensor positioned at the outlet of the air separation module;

a flow meter positioned at the outlet of the air separation module.

And the controller contains a computer program containing program code instructions that are readable and executable by said controller for the transmission of:

a decrease flow rate command to the motorized valve controlling the inert gas flow rate, depending upon the inert gas flow rate determined by the flow meter, in order to decrease the inert gas flow rate to a determined value;

a decrease air pressure command to the motorized valve controlling the air pressure, depending upon the oxygen concentration determined by the oxygen sensor, in order to increase the oxygen concentration from an initial value to a determined value.

The decrease inert gas flow rate command is defined in order to compensate for a loss of inert gas flow caused by the decrease in air pressure. The decrease air pressure command is defined in order to compensate for a reduction in the oxygen concentration caused by the inert gas flow rate reduction operation;

According to a second embodiment, the inerting system comprises a controller to which are connected:

a motorized inert gas flow rate control valve positioned at the outlet of the air separation module;

a motorized air pressure control valve positioned at the inlet of the air separation module;

an air pressure sensor positioned at the inlet of the air separation module;

an air temperature sensor positioned at the inlet to the air separation module;

a flow meter positioned at the outlet of the air separation module;

an atmospheric pressure sensor.

And the controller contains a computer program containing program code instructions that are readable and executable by said controller for the transmission of:

a decrease flow rate command to the motorized valve controlling the inert gas flow rate, depending upon the inert gas flow rate determined by the flow meter, in order to decrease the inert gas flow rate to a determined value;

a decrease air pressure command to the motorized valve controlling the air pressure, depending upon the oxygen concentration determined by the oxygen sensor and a pressure regulation setpoint, in order to increase the oxygen concentration from an initial value to a determined value, the pressure regulation setpoint being obtained from conversion software integrated into the controller and designed to convert an oxygen concentration regulation setpoint, as a function of the value of the inerting gas flow rate supplied by the flow meter, the temperature of the inerting gas supplied by the temperature sensor, the ambient atmospheric pressure supplied by the atmospheric pressure sensor, and the technical and performance characteristics of the air separation module integrated into the controller.

The decrease inert gas flow rate command is defined in order to compensate for a loss of inert gas flow caused by the decrease in air pressure. The decrease air pressure command is defined in order to compensate for a reduction in the oxygen concentration caused by the inert gas flow rate reduction operation.

Preferably, the decrease air pressure command is defined such that the inert gas oxygen concentration reaches a determined value corresponding to the initial oxygen concentration value before the decrease inert gas flow rate operation.

BRIEF DESCRIPTION OF THE DRAWINGS

Further advantages and features will become more apparent from the following description, given by way of a non-limiting example, of a control method for a fuel tank inerting system, from the attached drawings wherein.

DETAILED DESCRIPTION

Figure 1:
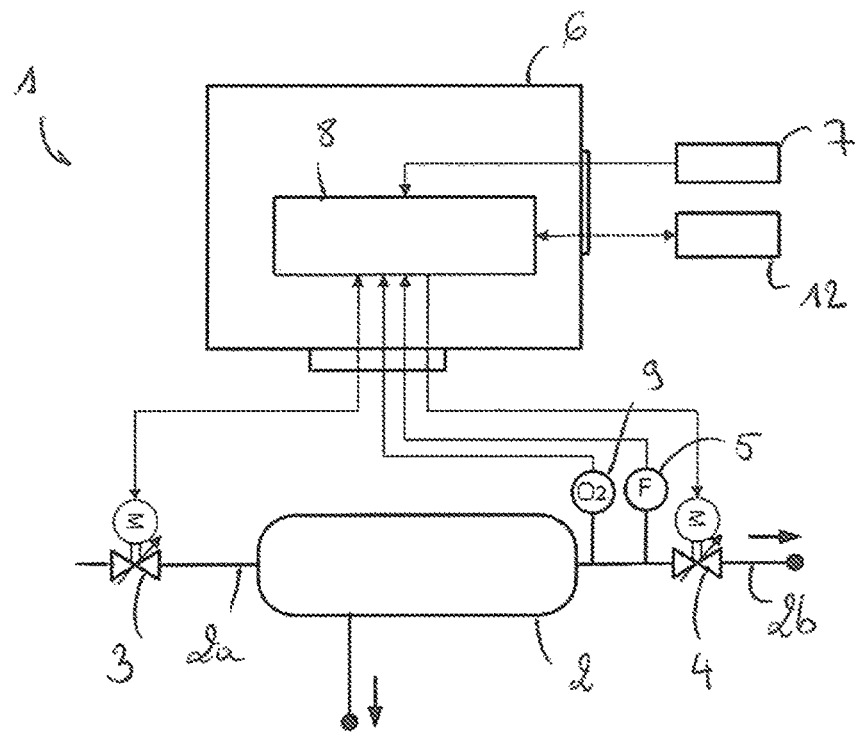
FIG. 1 schematically illustrates a first embodiment of an inerting system, particularly with regard to the arrangement of the controller, the air separation module and the various valves and sensors.
Figure 2:
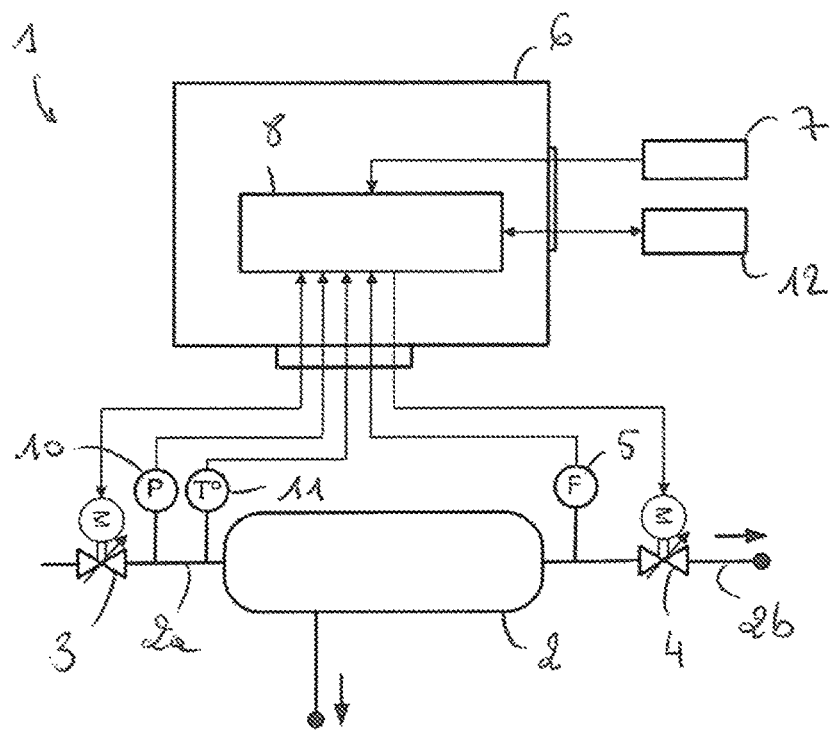
FIG. 2 is a schematic view similar to that of FIG. 1, illustrating a second embodiment of an inerting system.

With reference to FIGS. 1 and 2, an inerting system (1) is illustrated, intended for injecting a flow of inert gas into at least one fuel tank of an aircraft during the flight of the aircraft.

The inerting system (1) comprises at least one air separation module (2) supplied at the inlet (2a) thereof with air at a given pressure, in order to generate an inert gas at the outlet (2b) that is depleted in oxygen, to be injected into the fuel tank at a certain flow rate and with a certain concentration of oxygen.

The inerting system (1) comprises a motorized air pressure regulating valve (3) positioned at the inlet (2a) of the air separation module (2) and a motorized inert gas flow rate regulating valve (4) and a flow meter (5) positioned at the outlet (2b) of the air separation module (2). The motorized flow rate control valve (4), the flow meter (5), and the motorized pressure control valve (3) are connected to an electronic controller (6) supplied by an electrical power supply (7).

The electronic controller (6) integrates software (8) for managing the various elements of the inerting system (1) as described below, and implements a flow rate control law in order to decrease the inert gas flow rate to a determined value, and in order to decrease the air pressure at the inlet (2a) of the air separation module (2) in order to cause an increase in the oxygen concentration, from an initial value to a determined value.

Specifically, the operation for decreasing the inert gas flow rate is performed by compensating for a loss of inert gas flow caused by the air pressure reduction operation, and the operation for decreasing the air pressure is performed by compensating for a reduction in the oxygen concentration caused by the inert gas flow rate reduction operation.

In practice, the software (8) transmits a decrease flow rate command to the motorized valve (4) controlling the inert gas flow rate, depending upon the inert gas flow rate determined by the flow meter (5), in order to decrease the inert gas flow rate to a determined value that corresponds, as a function of the implemented inerting strategy, to a flow rate value determined as a function of an actual inert gas flow rate requirement determined at a given instant.

According to a first embodiment shown in FIG. 1, the inerting system (1) operates in a closed loop based upon the oxygen concentration value and comprises an oxygen sensor (9) positioned at the outlet (2b) of the air separation module (2) and connected to the controller (6) in order to determine the oxygen concentration within the inert gas.

According to this first embodiment, the software (8) also transmits a decrease air pressure command to the motorized valve (3) controlling the air pressure, depending upon the inert oxygen concentration determined by the oxygen sensor (9), in order to increase the oxygen concentration from an initial value to a determined value.

According to a second embodiment, illustrated in FIG. 2, the inerting system (1) operates in a closed loop based upon the air pressure value and in a closed loop based upon the oxygen concentration value, and comprises an air pressure sensor (10) and a temperature sensor (11) positioned at the inlet (2a) of the air separation module (2) and connected to the controller (6).

According to this second embodiment, the software (8) transmits a decrease air pressure command to the motorized valve (3) controlling the air pressure, depending upon the air pressure value determined by the air pressure sensor (10), and upon a pressure regulation setpoint in order to increase the oxygen concentration from an initial value to the determined value. The pressure regulation setpoint is obtained from a conversion table integrated into the software (8) of the controller (6). The conversion table is particularly designed in order to convert an oxygen concentration regulation setpoint to a pressure regulation setpoint. This conversion is performed based upon the inert gas flow rate value supplied by the flow meter (5), the inert gas temperature supplied by the temperature sensor (11), the ambient atmospheric pressure supplied by the atmospheric pressure sensor or recovered directly from data (12) supplied by the aircraft, and technical and performance characteristics of the air separation module (2) integrated into the software (8).

With both embodiments the decrease flow rate command is defined in order to compensate for a loss of inert gas flow caused by the decrease in air pressure and the decrease air pressure command is defined in order to compensate for a reduction in the oxygen concentration caused by the inert gas flow rate reduction.

The inert gas flow rate and air pressure control laws are combined and converge such that the air pressure and inert gas flow rate are adjusted to the values determined by the inerting strategy.

Depending upon the chosen inerting strategy, the concentration of oxygen within the inert gas can be adjusted, regardless of the value of the inert gas flow rate, to a determined value, for example based upon an actual inert gas flow rate requirement determined at a given instant, or else the oxygen concentration is increased in line with the reduction in the flow of inert gas in order to be constantly maintained at an initial value.

In a known manner, the inert gas is then conveyed to means for distributing the inert gas, such as distribution pipes, valves, and injection nozzles, for injection as such into the fuel tank(s) of aircraft for safety reasons in order to reduce the risk of explosion of said tanks. The injected inert gas allows the level of oxygen present within tank(s) to be reduced, and notably to maintain this level below a certain threshold, for example, less than 12%.

It is apparent from the foregoing that the present embodiments make it possible to significantly reduce the flow of air consumed by the air separation module (2) by overcoming the constraint of dependence between the inert gas flow rate and the purity of the inert gas that is inherent in the use of the air separation module (2). The presently described embodiments thus indirectly make it possible to reduce fuel consumption, to reduce the ecological footprint of the aircraft and the costs associated with the operation of the inerting system (1).

Reducing the consumption of incoming air also makes it possible to reduce the wear on the filters and membranes used within the inerting system (1), and thus to increase the service life thereof. The maintenance intervals are therefore elongated, decreasing the cost of ownership of the inerting system (1).

The invention claimed is:

1. A method for controlling an inerting system of at least one fuel tank of an aircraft, the inerting system comprising at least one air separation module supplied at the inlet with air at a certain pressure in order to generate at the outlet an inert gas to be injected into the fuel tank comprising a certain flow rate and a certain oxygen concentration, wherein the method comprises, at a given instant and at constant temperature and atmospheric pressure:

an operation whereby the inert gas flow rate is reduced to a determined value;

an operation whereby the air pressure is reduced in order to cause an increase in the oxygen concentration from an initial value to a determined value;

and wherein:

the operation of reducing the inert gas flow rate is performed by compensating for a loss of inert gas flow caused by the air pressure reduction operation;

the operation of reducing the air pressure is performed by compensating for a reduction in the oxygen concentration caused by the inert gas flow rate reduction operation.

2. A method according to claim 1, wherein the determined inert gas flow rate value corresponds to a value determined as a function of an actual inert gas flow rate requirement at the given instant.

3. A method according to claim 1, wherein the determined oxygen concentration value corresponds to a value determined as a function of an actual oxygen concentration requirement at the given instant.

4. A method according to claim 1, wherein the determined oxygen concentration value corresponds to the initial oxygen concentration value before the operation of reducing the inert gas flow rate.

* * * * *